United States Patent Office 2,710,856
Patented June 14, 1955

2,710,856

CONDENSATES OF TALL OIL WITH POLYALKYLENE POLYAMINES CONTAINING HYDROXY ETHYL GROUPS

Joseph Emmett Carpenter, Greenwich, Conn., assignor to American Cyanamid Company, New York, N. Y., a corporation of Maine No Drawing. Application December 22, 1951,
Serial No. 263,005

8 Claims. (Cl. 260—97.5)

This invention relates to cationic surface active agents comprising the reaction product of tall oil with polyalkylene polyamines. More particularly, the present invention is concerned with reacting tall oil with polyalkylene polyamines in which hydroxyalkyl substituents are present.

Tall oil is composed of a mixture of rosin acids, fatty acids (principally oleic acid and linoleic acid), lignin and unsaponifiable matter. Crude tall oil generally contains a relatively large per cent of rosin acids, frequently as much as 50% rosin acids. Depending upon the extent of the purification procedure, it is possible to obtain various purified fractions of tall oil where the rosin acid content may run as low as 1.0% rosin acid. The cost of such highly purified fractions of tall oil is of necessity quite high, as compared to the crude tall oil which is a by-product from sulfate paper manufacture.

It has been proposed to use the reaction products of polyalkylene polyamines and tall oil as cationic flotation reagents. By reacting the tall oil directly with the polyamine, however, products of inferior selectivity are produced because the reaction between the polyamine and the rosin acids of the tall oil is incomplete. The uncombined rosin acids possess anionic properties which cause the products to be much less selective than products prepared from rosin-free fatty acid materials.

I have discovered that by first reacting the polyalkylene polyamine with an amount of an alkylene oxide to provide hydroxyalkyl groups at least equivalent to the quantity of rosin acids in the tall oil, the reaction of the rosin acids can be made to take place, so that improved products are obtained which are markedly superior to those heretofore known.

There are several surprising features of this reaction. In the first place, the inertness of the rosin acids of tall oil is quite unexpected in view of the fact that abietic acid, gum rosin and the like react quite satisfactorily with polyamines when heated to a sufficiently high temperature. It can only be supposed that the tall oil rosin acids have in some not well understood manner isomerized in the heat treatment of the cooking process and have become unreactive. In the second place, the reaction between a polyamine with hydroxalkyl groups and tall oil does not produce the ester but produces the amide, as can be readily demonstrated by showing the disappearance of basic nitrogen by titrating the product with an acid. Presumably, the ester is first formed but rearranges to the amide. Finally, it is surprising that the reaction succeeds with a quantity of hydroxyalkyl substituents no more than equivalent to the quantity of rosin acids to be reacted. It would be expected that unless an appreciable excess of hydroxyalkyl groups were provided, some would be consumed by the fatty acids of the tall oil, so that not enough would be left to permit more than partial reaction of the rosin acids. Instead, the reaction of the fatty acids with amino groups and the reaction of the rosin acids with hydroxy groups seem to proceed virtually independently of each other.

It is an advantage of the present invention also that crude tall oil having a high rosin acid content may advantageously be used and that it is not necessary to resort to the more expensive tall oil having a low rosin acid content.

In carrying out a large number of experiments involving the reaction of various grades of tall oil directly with unsubstituted polyalkylene polyamines, I have determined that the degree of reaction of the rosin acids is only from about 12% to about 42%.

By the use of the hydroxyalkyl substituted polyalkylene polyamines of the present invention, however, I have found that substantially complete reaction of the rosin acids as well as the fatty acids of the tall oil takes place, the degree of reaction of the rosin acids being upwards from 90%.

Among the alkylene oxides that may be used for hydroxyalkylating the polyalkylene polyamines, there may be mentioned ethylene oxide, propylene oxide, butylene oxide and styrene oxide. Alternatively, halohydrins may be reacted with the polyamines, the resulting salts decomposed with sodium hydroxide, and the hydroxyalkyl substituted polyamines separated from the sodium chloride.

Representative polyalkylene polyamines which may be hydroxyalkylated by one of the agents hereinbefore mentioned and thereafter employed in condensing with tall oil, are diethylene triamine, dipropylene triamine, dibutylene triamine, triethylene tetramine, tetraethylene pentamine, and bis (3-amino propyl) amine, or mixtures of any two or more of such polyamines either as relatively pure compounds or crude mixtures. In general, they are polyamines containing at least 3 nitrogen atoms, which are separated from one another by hydrocarbon radicals containing from 2 to 12 carbon atoms. It is an advantage of the present invention that relatively crude mixtures of the various polyamines may be used, which results in the production of reagents at a lower cost than is possible by using the purified polyamines. In using mixtures of polyamines, it, of course, is not necessary that each individual polyamine contain hydroxyalkyl substituents. It suffices if the aggregate of the polyamine contain hydroxyalkyl substituents with which the rosin acids of the tall oil may react.

The invention will be described in greater detail in conjunction with the following specific examples which are illustrative only. Parts are by weight unless otherwise specified.

EXAMPLE 1

144.8 parts (0.500 equiv. based on the saponification number) of distilled tall oil containing 28.4 mol percent rosin acids were heated in a vessel equipped with a thermometer and a condenser set for distillation with 35.5 parts (1.000 equiv.) of commercial diethylene triamine which had previously been reacted with 0.142 equivalent of ethylene oxide to introduce hydroxyethyl groups equivalent to the 0.142 equivalent of rosin acids in the tall oil. Heating was continued until a temperature of 286° C. was reached. The volume of aqueous distillate collected was 13.8 parts by volume. Titration of the distillate plus methanol washings of the condenser and fittings showed a loss of amine of 0.037 equivalent. Potentiometric titration of a sample of the product dissolved in benzene and methanol, using glass electrodes and titrating with 0.5 N HCl in ethanol, showed a residual amine content of 0.472 equivalent. Consequently, 1.000−0.037−0.472=0.491 equivalent of amine consumed in the reaction and the quantity of unreacted acids remaining may be calculated as 0.500−0.491=0.009 equivalent. Therefore, the indicated degree of reaction of the rosin acids is $$\frac{0.142-0.009}{0.142}=94\%$$

EXAMPLE 2

44.0 parts (1.015 equiv.) of commercial triethylene tetramine in 45 parts of water were reacted with 9.7 parts (0.167 equiv.) of propylene oxide. After distilling off the water, the amine was reacted with 155.0 parts (0.500 equiv.) of another distilled tall oil containing 0.167 equivalent rosin acids, with a final reaction temperature of 270° C. being obtained. While potentiometric titration of the product yielded an indistinct endpoint, the quantity of water produced in the reaction was the same as that obtained when an ordinary fatty acid is reacted with the same proportion of triethylene tetramine, indicating substantially complete reaction of the rosin acids.

EXAMPLE 3

73.3 parts of a reaction product of commercial tetraethylene pentamine with ethylene oxide containing 1.26 equivalent of amine by titration and 0.25 equivalent ethylene oxide were reacted with 170.0 parts (0.55 equiv.) of crude tall oil containing about 50% rosin acids. Water was distilled out as formed until a final reaction temperature of 270° C. was obtained, the completeness of the reaction again being judged by the collection of the expected quantity of water, indicating substantially complete reaction of the rosin acids.

EXAMPLE 4

59.1 parts (1.56 equiv.) of 85% grade diethylene triamine (a mixture containing 15% higher polyamines) were dissolved in an equal weight of water and reacted with 10.8 parts (0.246 equiv.) of ethylene oxide. After distilling off the water, 170.0 parts (0.55 equiv.) of crude tall oil containing 0.246 equivalent rosin acids were added and the mixture heated over a period of 69 minutes to a final reaction temperature of 263° C., water being distilled off from the reaction as formed. Potentiometric titration of a sample of the product showed a basic amine content of 0.96 equivalent. Titration of the aqueous distillate plus methanol washings of the condenser and fittings showed a loss of amine of 0.05 equivalent. Therefore 1.56—0.96—0.05=0.55 equivalent of amine consumed in the reaction. This indicates substantially 100% reaction of the rosin acids in the tall oil.

EXAMPLE 5

131 parts (1 mol) of bis (3-aminopropyl) amine are heated to 120° C. and 53.0 parts (0.56 mol) of trimethylene chlorohydrin added dropwise. The resulting salt is dissolved in water and 23 parts sodium hydroxide added as a 50% solution, after which the water is evaporated off in a steam bath, and the dry residue extracted with alcohol. After distilling off the alcohol, 41 parts (0.755 equiv.) of the product are heated at 120° C. with 144.8 parts distilled tall oil containing 0.142 equivalent of rosin acids, with benzene under a reflux condenser with a water trap for about 24 hours, in which time the theoretical 9.0 parts by volume of water collects, indicating complete reaction.

The utility of the compounds of the present invention will be further illustrated in conjunction with the following example of ore beneficiation. It is to be understood that the present invention is not restricted to quantities of hydroxyalkyl substituent precisely equivalent to the number of equivalents of rosin acids in the tall oil desired to be reacted, but that a moderate excess may be used. I have found, however, that the introduction of wateracid hydroxyalkyl groups into a polyamine type cationic flotation reagent tends to weaken the reagent by decreasing its water-repellency, and, therefore, I prefer to use quantities of hydroxyalkyl substituents close to equivalency. While the reaction of the rosin acids of tall oil will, of course, take place with a polyamine containing hydroxyalkyl groups greatly in excess of the requirements of the rosin acids, it is undesirable to use even so much hydroxyalkyl substituent as to be equivalent to the total (fatty plus rosin) acids of the tall oil. With such proportions, the effectiveness of the condensate as a cationic flotation reagent is seriously impaired, as is shown by test No. 3 reported in the table below.

EXAMPLE 6

A sample of Florida pebble phosphate was made into a rougher concentrate assaying 69.02% B. P. L. and 11.06% insoluble, and was de-oiled and deslimed as feed for silica flotation. A 560 gram charge of the phosphate was conditioned for three seconds with the particular reagents by agitation at 22% solids in a Fagergren flotation machine and floated for 40 seconds. The reagents used were the acetates of a condensate of tall oil containing 28% rosin acids with a hydroxy-alkyl polyamine prepared by the reaction of ethylene oxide with diethylene triamine. The ratio of tall oil to diethylene triamine to ethylene oxide is expressed by equivalents and is shown in column 2 of the following table.

*Table*

| Test No. | Reagent Composition, Ratio by Equiv. | Calc. Feed | | Underflow (Phosphate Product) | | | Float Product | | | |
|---|---|---|---|---|---|---|---|---|---|---|
| | | Percent BPL | Percent Insol. | Percent Wt. | Percent BPL | Percent Insol. | Percent Wt. | Percent BPL | Percent Insol. | Dist. Insol. |
| 1 | 1:1.5:0.28 | 70.21 | 9.99 | 91.06 | 75.93 | 2.72 | 8.94 | 11.97 | 84.06 | 75.21 |
| 2 | 1:1.5:0.50 | 70.21 | 10.14 | 91.78 | 75.58 | 3.31 | 8.22 | 10.24 | 86.36 | 70.03 |
| 3 | 1:1.5:1.00 | 70.37 | 10.01 | 94.49 | 74.20 | 5.12 | 5.60 | 5.60 | 92.44 | 51.72 |

It is to be particularly observed from the foregoing table that when the amount of hydroxyalkyl substituent is greatly in excess of the number of equivalents of rosin acid present in the tall oil, as is shown in Test No. 3, the metallurgical results are greatly inferior to those obtained in Tests Nos. 1 and 2 where the proportion of the hydroxyalkyl substituent is equivalent to or only slightly exceeds the number of equivalents of rosin acid present in the tall oil.

I claim:

1. A cationic surface active agent comprising the product obtained by reacting tall oil at a temperature of from about 120° C. to 300 C. with a quantity of a polyalkylene polyamine containing at least 3 nitrogen atoms, said quantity of polyalkylene polyamine containing amino nitrogen at least equivalent chemically to the fatty acids plus the rosin acids of said tall oil, and said quantity of polyalkylene polyamine also containing hydroxyalkyl substituents at least equivalent chemically to said rosin acids of said tall oil but less than the number of equivalents of said rosin acids plus said fatty acids of said tall oil whereby said rosin acids are substantially completely combined with said polyalkylene polyamine.

2. A cationic surface active agent comprising the product obtained by reacting tall oil at a temperature of from about 120° C. to 300° C. with a quantity of a polyalkylene polyamine containing at least 3 nitrogen atoms, said quantity of polyalkylene polyamine containing amino nitrogen at least equivalent chemically to the fatty acids plus the rosin acids of said tall oil, and said quantity of polyalkylene polyamine also containing hydroxyethyl substituents at least equivalent chemically to said rosin acids of said tall oil but less than the number of equivalents of said rosin acids plus said fatty acids of said tall oil whereby said rosin acids are substantially completely combined with said polyalkylene polyamine.

3. A cationic surface active agent comprising the product obtained by reacting tall oil at a temperature of from about 120° C. to 300° C. with a quantity of a polyethylene polyamine containing at least 3 nitrogen atoms, said quantity of polyethylene polyamine containing amino nitrogen at least equivalent chemically to the fatty acids plus the rosin acids of said tall oil, and said quantity of polyethylene polyamine also containing hydroxyethyl substituents at least equivalent chemically to said rosin acids of said tall oil but less than the number of equivalents of said rosin acids plus said fatty acids of said tall oil whereby said rosin acids are substantially completely combined with said polyethylene polyamine.

4. A cationic surface active agent as in claim 3 wherein the polyethylene polyamine is diethylene triamine.

5. A process of condensing tall oil with a polyalkylene polyamine which comprises reacting tall oil at a temperature of from about 120° C. to 300° C. with a quantity of a polyalkylene polyamine containing at least 3 nitrogen atoms, said quantity of polyalkylene polyamine containing amino nitrogen at least equivalent chemically to the fatty acids plus the rosin acids of said tall oil, and said quantity of polyalkylene polyamine also containing hydroxyalkyl substituents at least equivalent chemically to said rosin acids of said tall oil but less than the number of equivalents of said rosin acids plus said fatty acids of said tall oil whereby substantially complete combination of said rosin acids with said polyalkylene polyamine is effected.

6. A process of condensing tall oil with a polyalkylene polyamine which comprises reacting tall oil at a temperature of from about 120° C. to 300° C. with a quantity of polyalkylene polyamine containing at least 3 nitrogen atoms, said quantity of polyalkylene polyamine containing amino nitrogen at least equivalent chemically to the fatty acids plus the rosin acids of said tall oil, and said quantity of polyalkylene polyamine also containing hydroxyethyl substituents at least equivalent chemically to said rosin acids of said tall oil but less than the number of equivalents of said rosin acids plus said fatty acids of said tall oil whereby substantially complete combination of said rosin acids with said polyalkylene polyamine is effected.

7. A process of condensing tall oil with a polyethylene polyamine which comprises reacting tall oil at a temperature of from about 120° C. to 300° C. with a quantity of polyethylene polyamine containing at least 3 nitrogen atoms, said quantity of polyethylene polyamine containing amino nitrogen at least equivalent chemically to the fatty acids plus the rosin acids of said tall oil, and said quantity of polyethylene polyamine also containing hydroxyethyl substituents at least equivalent chemically to said rosin acids of said tall oil but less than the number of equivalents of said rosin acids plus said fatty acids of said tall oil whereby substantially complete combination of said rosin acids with said polyethylene polyamine is effected.

8. A process as in claim 7 wherein the polyethylene polyamine is diethylene triamine.

References Cited in the file of this patent

UNITED STATES PATENTS

| | | |
|---|---|---|
| 2,312,387 | Christmann | Mar. 2, 1943 |
| 2,414,065 | Scott | Jan. 7, 1947 |
| 2,419,404 | Johnson | Apr. 22, 1947 |
| 2,541,825 | Mannheimer | Feb. 13, 1951 |
| 2,543,223 | Blair | Feb. 27, 1951 |
| 2,640,822 | Harman et al. | June 2, 1953 |

FOREIGN PATENTS

| | | |
|---|---|---|
| 437,104 | Great Britain | Oct. 16, 1935 |